United States Patent [19]

Darnell et al.

[11] Patent Number: 5,962,622
[45] Date of Patent: Oct. 5, 1999

[54] PROCESS FOR PREPARING THE POLYCARBONATE OF 2,2,4,4-TETRAMETHYL-1,3-CYCLOBUTANEDIOL

[75] Inventors: William R. Darnell, Weber City, Va.; John C. Morris, Kingsport, Tenn.

[73] Assignee: Eastman Chemical Company, Kingsport, Tenn.

[21] Appl. No.: 08/996,597

[22] Filed: Dec. 23, 1997

Related U.S. Application Data

[60] Provisional application No. 60/034,992, Dec. 28, 1996.
[51] Int. Cl.[6] .................................................. C08G 64/00
[52] U.S. Cl. ............................................ 528/196; 528/198
[58] Field of Search .................................... 528/196, 198

[56] References Cited

U.S. PATENT DOCUMENTS

| T858,012 | 1/1969 | Caldwell et al. . | |
|---|---|---|---|
| T873,016 | 4/1970 | Gilkey et al. . | |
| T875,010 | 6/1970 | Coover et al. . | |
| 2,210,817 | 8/1940 | Peterson | 528/196 |
| 2,787,632 | 4/1957 | Stevens | 528/196 |
| 2,789,968 | 4/1957 | Reynolds et al. | 528/196 |
| 2,789,972 | 4/1957 | Reynolds et al. | 528/196 |
| 3,022,272 | 2/1962 | Schnell et al. | 528/196 |
| 3,030,335 | 4/1962 | Goldberg | 528/196 |
| 3,313,777 | 4/1967 | Elam et al. | 528/176 |
| 3,317,466 | 5/1967 | Caldwell et al. | 528/176 |
| 3,335,111 | 8/1967 | Pray et al. | 528/196 |
| 3,772,405 | 11/1973 | Hamb | 528/176 |
| 4,182,726 | 1/1980 | Illuminati et al. | 528/196 |
| 4,263,364 | 4/1981 | Seymour et al. | 528/271 |
| 4,350,805 | 9/1982 | Jackson, Jr. et al. | 528/271 |
| 4,585,854 | 4/1986 | Tung et al. | 528/196 |
| 5,171,830 | 12/1992 | Grey | 528/371 |

FOREIGN PATENT DOCUMENTS

| 1520093 | 11/1969 | Germany . |
|---|---|---|
| 63-92644 | 4/1988 | Japan . |
| 64-1724 | 1/1989 | Japan . |
| 1156222 | 6/1969 | United Kingdom . |

OTHER PUBLICATIONS

JP Abstract 02/180954; published Jul. 13, 1990; (Kuraray Co., Ltd.).
JP Abstract 01/004617; published Jan. 9, 1989; (Asahi Chemical Ind. Co., Ltd.).
Haggin, "Catalytic Cosynthesis Method Developed," Chemical and Engineering News, pp. 25–26, May 4, 1992.
Gawlak et al., "Polycarbonates from the 2,2,4,4,–Tetramethylcyclobutane–1,3–Diols," Chemistry and Industry, pp. 1148–1149, Jun. 23, 1962.
Schnell "Chemistry and Physics of Polycarbonates, Polymer Reviews," vol. 9, Interscience Publishers (Germany), pp. 9–24, 1964.

*Primary Examiner*—Terressa Mosley
*Attorney, Agent, or Firm*—Betty J. Boshears; Harry J. Gwinnell

[57] ABSTRACT

The invention relates to a method for preparing a polycarbonate, by mixing a compound having the structure I:

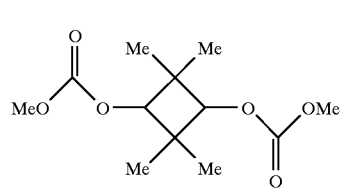

and a basic catalyst, and heating the mixture to produce the polycarbonate. The invention also relates to poly(2,2,4,4-tetramethyl-1,3-cyclobutylene carbonate) with an inherent viscosity of at least 0.7 dL/g. The invention also relates to an article made from the polycarbonate and a blend containing poly(2,2,4,4-tetramethyl-1,3-cyclobutylene carbonate).

35 Claims, No Drawings

PROCESS FOR PREPARING THE POLYCARBONATE OF 2,2,4,4-TETRAMETHYL-1,3-CYCLOBUTANEDIOL

CROSS REFERENCE TO RELATED APPLICATIONS

This application claims priority upon U.S. provisional application serial No. 60/034,992, filed Dec. 28, 1996, the contents of which are hereby incorporated in their entirety by this reference.

FIELD OF THE INVENTION

The present invention relates to a process for the preparation of the polycarbonate of 2,2,4,4-tetramethyl-1,3-cyclobutanediol from a monomeric biscarbonate ester of 2,2,4,4-tetramethyl-1,3-cyclobutanediol.

BACKGROUND

Poly (2,2,4,4-tetramethyl-1,3-cyclobutylene carbonate) is useful as a molding resin and possesses excellent weatherability for outdoor applications and possesses low birefringence for use as compact discs. Polycarbonates are most commonly made by the use of phosgene. However, the use of the highly toxic phosgene and organic solvents, as well as the expense of solution polymerization methods, has prompted chemists to seek out other methods of producing polycarbonates.

Melt preparation of poly(2,2,4,4-tetramethyl-1,3-cyclobutylene carbonate) is challenging because it has a melting point much higher than its decomposition temperature. At decomposition temperatures, poly(2,2,4,4-tetramethyl-1,3-cyclobutylene carbonate) ring-opens to produce carbon dioxide and 2-methyl-4,4-dimethyl-2-pentenal.

U.S. Pat. No. 5,171,830 discloses a melt method for making polyalkylene carbonates by reacting a glycol having at least 4 carbon atoms separating the hydroxyl groups with a diester of carbonic acid in the presence of a catalyst. This excludes 2,2,4,4-tetramethyl-1,3-cyclobutanediol, which has only 3 carbons separating the hydroxyl groups. Glycols which possess hydroxyl groups that are separated by 2 or 3 carbon atoms present a special problem for polycarbonate preparation by methods known in the art. These glycols tend to cyclize to produce five and six membered cyclic carbonates which vaporize.

Defensive Publication T873,016 discloses a method of producing low molecular weight poly(2,2,4,4-tetramethyl-1,3-cyclobutylene carbonate) by self-condensing the diethyl ester of 2,2,4,4-tetramethyl-1,3-cyclobutanediol. Defensive Publication T873,016 also discloses a method of reacting the glycol with diphenyl carbonate, which results in the formation of a colored polymer.

Methods for producing polycarbonates disclosed in the art produce low molecular weight polycarbonates when 2,2,4,4-tetramethyl-1,3-cyclobutanediol is employed as the glycol reactant. Japanese Patent 62-155370 discloses a process of reacting dialkyl carbonates with a glycol in the presence of a titanium catalyst. U.S. Pat. No. 3,022,272 discloses a process of reacting a dialkyl carbonate with a glycol. Diphenyl carbonate is disclosed as the preferred dialkyl carbonate, even though aromatic carbonates produce colored polymers. Lastly, U.S. Pat. No. 3,313,777 discloses a method of producing low molecular weight poly(2,2,4,4-tetramethyl-1,3-cyclobutylene carbonate) by reacting dibutyl carbonate with the glycol. Moreover, the resultant polymer solidified in the reaction vessel, requiring very impractical recovery measures to be taken.

In previous polycarbonate processes, dimethyl carbonate has not been used in the preparation of polycarbonates, even though it is the least expensive and most readily available dialkyl carbonate known in the art. Dimethyl carbonate is the only dialkyl carbonate to form an azeotrope with its alkanol.

U.S. Pat. No. 3,335,111 discloses a melt method of continuously preparing aromatic high molecular weight polycarbonates by reacting a dihydroxy aromatic organic compound with a monomeric biscarbonate ester of a dihydroxy compound at a temperature of from about 200° C. to 325° C. in a succession of reaction zones. Also disclosed is a less preferred method of condensing biscarbonate esters of dihydroxy compounds to form polycarbonate. The polymerization catalysts disclosed for the process of U.S. Pat. No. 3,335,111 are basic metal salts such as hydrides of metals of Groups I, II and III; oxides, hydroxides, phenoxides, and alkoxides of metals of Groups I and II; and metal alkyls of Groups I, II, III and IVA metals.

Defensive Publication T858,012 discloses a melt method of preparing the polycarbonate of 2,2,4,4-tetramethyl-1,3-cyclobutanediol (TMCD) by reacting TMCD with 2,2,4,4-tetramethyl-1,3-cyclobutane bis(ethyl carbonate) in the presence of a dibutyltin oxide catalyst. However, this process produces low molecular weight discolored polymers having inherent viscosities of less than about 0.4 dL/g.

The melt production of poly(2,2,4,4-tetramethyl-1,3-cyclobutylene carbonate) from 2,2,4,4-tetramethyl-1,3-cyclobutanediol is difficult due to the thermal decomposition of TMCD in the presence of basic catalysts. In light of the above, it would be desirable to have a melt process for economically producing high molecular weight poly(2,2,4,4-tetramethyl-1,3-cyclobutylene carbonate).

SUMMARY OF THE INVENTION

In accordance with the purposes of this invention, as embodied and broadly described herein, this invention, in one aspect, relates to a method for preparing polycarbonate, comprising:

(a) admixing
(i) a compound having the structure I:

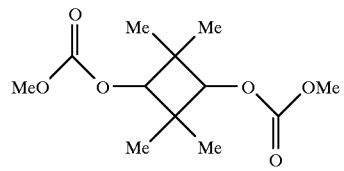

and
ii) a basic catalyst, and
(b) heating the admixture of step (a) to produce the polycarbonate.

The invention further relates to a process of preparing poly(2,2,4,4-tetramethyl-1,3-cyclobutylene carbonate) comprising condensing carbonic acid 3-methoxycarbonyloxy-2,2,4,4-tetramethyl-cyclobutyl ester methyl ester in the presence of a catalyst selected from the group consisting of alkali metals, alkoxides of alkali metals, carboxylates of alkali metals, and mixtures thereof under polycondensation conditions of temperature and pressure.

The invention further relates a process of preparing poly(2,2,4,4-tetramethyl-1,3-cyclobutylene carbonate), comprising condensing carbonic acid 3-methoxycarbonyloxy-2,2,4,4-tetramethyl-cyclobutyl ester methyl ester in the presence of a catalyst selected from the group consisting of alkali metals, alkoxides of alkali metals, carboxylates of alkali metals, and mixtures thereof under polycondensation conditions of temperature and pressure.

The invention further relates to the polycarbonates produced by the processes described above.

The invention further relates to a polycarbonate, comprising poly(2,2,4,4-tetramethyl-1,3-cyclobutylene carbonate) with an inherent viscosity of at least 0.7 dL/g, as determined in 60/40 wt/wt phenol/tetrachlorethane solution at 25° C.

The invention further relates to a blend, comprising the polycarbonate of the present invention and a second polycarbonate, a polyester, a polyether, a polyacetal, a polyolefin, a cellulose material, a polyurethane, a polyamide, or a combination thereof.

The invention further relates to an article made by a polycarbonate and a blend of the present invention.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

The term "low color" refers to a polycarbonate that is colorless or substantially free of color.

In accordance with the purpose(s) of this invention, as embodied and broadly described herein, this invention, in one aspect, relates to a method for preparing polycarbonate, comprising:

(a) admixing
(i) a compound having the structure I:

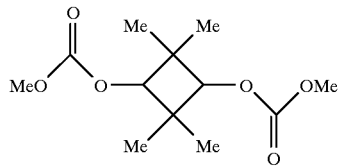

and
ii) a basic catalyst, and
(b) heating the admixture of step (a) to produce the polycarbonate.

The invention further relates to a process of preparing poly(2,2,4,4-tetramethyl-1,3-cyclobutylene carbonate) comprising condensing carbonic acid 3-methoxycarbonyloxy-2,2,4,4-tetramethyl-cyclobutyl ester methyl ester in the presence of a catalyst selected from the group consisting of alkali metals, alkoxides of alkali metals, carboxylates of alkali metals, and mixtures thereof under polycondensation conditions of temperature and pressure.

The applicants unexpectedly discovered a process by which a compound having the structure I, hereinafter referred to as "TMCD bis(methyl carbonate)" for convenience, produces high molecular weight poly(2,2,4,4-tetramethyl-1,3-cyclobutylene carbonate) in the presence of a basic catalyst.

There has been no suggestion or teaching in the art to demonstrate that the polymerization of TMCD bis(methyl carbonate) results in the formation of high molecular weight poly(2,2,4,4-tetramethyl-1,3-cyclobutylene carbonate) when compared to the use of higher molecular weight alkyl carbonates. However, bis(alkyl carbonates) of TMCD, wherein the alkyl group is larger than methyl (i.e. ethyl, propyl, etc.), were found to produce only low molecular weight polymers.

A further unexpected aspect of the present invention is that TMCD bis(methyl carbonate) does not decompose in the presence of the basic catalyst of the present invention, which is required to promote the reaction. Previous melt methods for preparing aliphatic polycarbonates from the condensation of dicarbonates motivates or directs one of ordinary skill in the art not to use the basic catalysts of the present invention. One of ordinary skill in the art would not expect a dicarbonate of TMCD, and, in particular, TMCD bis(methyl carbonate), to withstand such rigorous basic conditions without degrading enough to at least substantially discolor the polycarbonate. However, the polymer produced by the present invention has low color.

In one embodiment, poly(2,2,4,4-tetramethyl-1,3-cyclobutylene carbonate) is prepared by the self-condensation reaction of TMCD bis(methyl carbonate) in the presence of a catalyst comprising alkali metals, alkoxides of alkali metals, and carboxylates of alkali metals under polycondensation conditions of temperature and pressure.

In another embodiment, poly(2,2,4,4-tetramethyl-1,3-cyclobutylene carbonate) having a high molecular weight and low color are obtained when TMCD bis(methyl carbonate) contains less than about 5 mole %, preferably less than 2 mole %, hydroxyl groups. The applicants have found that the presence of more than about 5 mole % hydroxyl groups results in low yields of the polymer.

The TMCD bis(methyl carbonate) can be cis, trans, or a mixture thereof. In one embodiment, TMCD bis(methyl carbonate) has at least 40 mole % trans isomers, such that the total cis and trans isomer content is equal to 100 mole %. In a preferred embodiment, TMCD bis(methyl carbonate) is from 50 to 60 mole % the trans isomer.

TMCD bis(methyl carbonate) used in the present invention can be obtained by a process comprising reacting from about 5 to 40 mole % TMCD and from about 60 to 95 mole % dimethyl carbonate, wherein the total mole % equals 100 mole %, in the presence of a basic catalyst comprising lithium alkoxides, sodium alkoxides, lithium metal, sodium metal, or a combination thereof. The concentration of catalyst is from about 0.015 to 0.7 mole %, based on the concentration of TMCD. The process for making TMCD bis(methyl carbonate) is disclosed in applicants' copending application (Ser. No. 60/034,989), incorporated herein in its entirety by this refernce.

Bis(alkyl carbonates) of TMCD, wherein the alkyl group is larger than methyl, are not useful for making colorless, high molecular weight polycarbonates. For example, when attempting to make a polycarbonate from TMCD bis(ethyl carbonate) by melt phase polymerization, only low molecular weight polymers (IV<0.4) or discolored polymers were obtained. Aromatic carbonates are likewise unsuitable because they tend to produce yellow discolored polymer.

In one embodiment, a modifying biscarbonate can be admixed with TMCD bis(methyl carbonate) and basic catalyst prior to the heating step. The modifying carbonate can change the properties of the polycarbonate (i.e. melt viscosity, glass transition temperature). The modifying carbonate is the reaction product between a modifying glycol and dimethyl carbonate. In one embodiment, the modifying glycol is an aliphatic glycol having from 2 to 8 carbon atoms. Examples of modifying glycols include, but are not limited to, 1,2-propanediol, ethylene glycol, 1,3-propanediol, neopentyl glycol, 1,2-, 1,3-, 1,4-butanediol, 1,5-pentanediol, and 1,6-hexanediol. In one embodiment, the modifying carbonate is from 0.1 to 10 mole %, preferably from 0.1 to 5 mole %, wherein the sum of the modifying carbonate and TMCD bis(methyl carbonate) is 100 mole %.

Basic catalysts useful in the present invention include, but are not limited to, the alkali metals such as lithium, sodium, and potassium as well as alkoxide and carboxylate salts derived from these metals. In one embodiment, low molecular weight alkoxide and carboxylate salts are useful salts since the liberated alcohol or organic acid will be more volatile and, thus, readily removable from the reaction mixture through distillation. Examples of alkali metal salts include, but are not limited to, a methoxide, an ethoxide, an isopropoxide, a butoxide, an isobutoxide, a formate, or an acetate of an alkali metal. In a one embodiment, the basic catalyst is elemental lithium, sodium, and potassium or a formate or acetate salt of lithium, sodium or potassium. In a preferred embodiment, the basic catalyst is lithium and sodium.

Catalysts, such as titanium tetraisopropoxide, dibutyltin diacetate, zinc acetate, magnesium methoxidel 4-dimethylaminopyridine and the like, which are generally useful in condensation polymerization reactions to make polycarbonates, are not useful in the present invention for the production of high molecular weight polycarbonates with low color.

In one embodiment, the amount of basic catalyst is from 10 to 400 ppm (parts by weight of catalyst per million parts by weight of the biscarbonate), preferably from 25 to 200 ppm, and more preferably from 50 to 100 ppm. When less than 50 ppm catalyst is used, the reaction rate is slow. A concentration greater than 400 ppm of basic catalyst increases degradation rates excessively during polymerization, which results in the formation of a low molecular weight polycarbonate.

During the self-condensation of TMCD bis(methyl carbonate), dimethyl carbonate is produced. In one embodiment, dimethyl carbonate is removed from the reaction mixture by distillation as it is produced in order for the self-condensation reaction to go to completion.

In one embodiment, the heating step is from 160° C. to 280° C. In another embodiment, the heating step is initially from 160 to 180° C. As the condensation reaction proceeds, the temperature is gradually increased. In one embodiment, the heating step occurs in stages. In a preferred embodiment, the heating step occurs at from 3 to 5 stages, up to a maximum temperature of 280° C. In another embodiment, once the temperature of the heating step reaches 280° C., a vacuum is gradually applied. In another embodiment, the final stage of the heating step is conducted under high vacuum, preferably less than 1 mm Hg pressure.

Temperatures higher than about 280° C. and long heating periods should be avoided to prevent degradation and discoloration of the polymers. In one embodiment, each reaction stage does not exceed 2 hours. In another embodiment, the total reaction period preferably does not exceed 6 hours. One object of the present invention is to produce a polymer having low color.

In another embodiment, TMCD bis(methyl carbonate) are admixed with lithium or sodium, and the admixture is heated from 160 to 280° C.

The process of the present invention produces polymers with inherent viscosities greater than about 0.4 dL/g, measured in 60/40 wt./wt. phenol/tetrachloroethane solution at 25° C. The inherent viscosity of the polymer produced is preferably greater than about 0.7 dL/g.

The invention further relates to the polycarbonates produced by the present invention.

High molecular weight polycarbonates having inherent viscosities of 1.0 dL/g or higher can be produced by the present invention. In one embodiment, the present invention can be used to produce polycarbonates having inherent viscosities in the range of from 0.3 to about 0.7 dL/g, which are then further polymerized in the solid state. Such solid state polycondensation techniques are well known in the art. The polycarbonate prepared in the melt process of the present invention can be granulated or pelletized by conventional methods, optionally crystallized by heat or contacting the polymer granules with a solvent, such as acetone or toluene, and then polymerized in the solid state at temperatures less than the melting point of the polycarbonate. In one embodiment, solid state polymerization can be conducted in a reaction vessel under vacuum or with an inert gas purge such as nitrogen or argon passing through the reaction vessel to remove liberated dimethyl carbonate.

The invention further relates to a polycarbonate, comprising poly(2,2,4,4-tetramethyl-1,3-cyclobutylene carbonate) with an inherent viscosity of at least 0.7 dL/g, as determined in 60/40 wt/wt phenol/tetrachlorethane solution at 25° C. The polycarbonates of the present invention have low color.

The degree of crystallinity and the melting point of the polymer produced by the present process will vary depending on the cis/trans ratio of the monomer units in the polymer chain. In one embodiment, the least crystalline polymers contain about 20 mole % trans monomer units and have a melting point of from 200 to 270° C. In another embodiment, polycarbonates having a 50/50 cis/trans mixture will have a melting point of from 260 to 270° C. In a preferred embodiment, the polycarbonate has from 40 to 60 mole % trans units, more preferably from 50 to 60 mole % trans units. The polycarbonates of the present invention have good properties for the films, extruded sheets, and molded parts.

In another embodiment, the polycarbonate can be used in unmodified form as a molding composition or may be blended with other polymers. Examples of polymers that can be blended with the polycarbonates of the present invention include, but are not limited to, a second polycarbonate, a polyester, a polyether, a polyacetal, a polyolefin, a cellulose material, a polyurethane, or a polyamide. In another embodiment, additives can be added to polycarbonates of the present invention and the blends containing polycarbonates of the present invention. Examples of additives include, but are not limited to, an antioxidant, a stabilizer, a pigment, a colorant, a filler, or a reinforcement agent.

In another embodiment, an article can be made from the polycarbonate and the blend of the present invention. The articles have good weathering resistance and hydrolytic stability.

EXAMPLES

The following examples are put forth so as to provide those of ordinary skill in the art with a complete disclosure and description of how the compositions of matter and methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in °C. or is at room temperature and pressure is at or near atmospheric.

Example 1—(Comparative)

This example illustrates the self-condensation of TMCD bis(ethyl carbonate). This example demonstrates that, unlike the process of the present invention, which is illustrated in Examples 2–5, a polycarbonate having high inherent viscosity is not obtained when the starting material is the bis(ethyl carbonate) even when a basic catalyst is used.

A 100 ml round bottom flask and metal stirrer were washed with hot acetic acid, rinsed carefully with demineralized water, and dried. In this flask, 43.25 grams (0.15 mols) of 57/43 TMCD bis(ethyl carbonate) and 2 drops of lithium metal dispersion in mineral oil (0.00172 grams Li per drip; about 134 ppm Li) were added. The flask was evacuated and purged three times with argon. The flask was then immersed in a Belmont metal bath at 180° C. and the reaction mixture was heated with stirring for 30 minutes. A small amount of distillate was allowed to distill from the flask during this time. The polymerization was continued by heating the reaction mixture at 200° C. for 1 hour, at 220° C. for 1 hour, at 240° C. for 1 hour, and at 250° C. under a reduced pressure of 1 mm Hg while stirring. The polymerization was continued under these conditions for 2 hours.

The viscous amber polymer melt was allowed to cool at 250° C. under an inert atmosphere. The flask was broken to recover 15.71 grams of amber polymer. The polymer had a Tm (melting point) of 210° C. as determined by DSC (differential scanning calorimetry), a Tg (glass transition temperature) of 106° C. by DSC, an IV (inherent viscosity) of 0.36 dL/g, as determined in 60/40 phenol/tetrachloroethane solution, and a cis/trans ratio of 77/23, as determined by proton NMR (nuclear magnetic resonance spectroscopy) analysis.

The polymerization was repeated using sodium formate catalyst (200 ppm Na) instead of lithium and the yellow polymer obtained had a Tm of 241° C., a Tg value of 105°, an IV of 0.31 dL/g and a cis/trans ratio of 62/38. Similarly, poor results were achieved when titanium isopropoxide (100 ppm Ti) and dibutyltin diacetate (200 ppm Sn) were used as catalysts.

Example 2

This Example illustrates the polymerization of TMCD bis(methyl carbonate).

Using the general procedure of Example 1, 39.0 grams (0.15 moles) of 46/54 cis/trans TMCD bis(methyl carbonate) were polymerized using 67 ppm lithium metal catalyst. The final polymerization temperature was 280° C. and final vacuum was 1.8 mm Hg. The colorless polymer (23.52 g) had an IV of 0.72 dL/g, Tm of 269° C., Tg of 131° C., and a cis/trans ratio of 53/47. Films were melt pressed on a Hannifin press of 290° C. per 20 seconds. The films were very tough and colorless with a light haze.

Example 3

The procedure of Example 2 was repeated using 39.0 grams (0.15 moles) of 58/42 cis/trans TMCD bis(methyl carbonate), 134 ppm lithium metal catalyst, and a final polymerization temperature of 250° C. at 1.0 mm Hg. The light yellow polymer had an IV of 0.59 dL/g, Tm of 221° C., Tg of 129° C. and a cisltx-ans ratio of 66/34.

Example 4

The procedure of Example 2 was repeated using 39.0 grams (0.15 moles) of 46/54 cis/trans TMCD bis(methyl carbonate), 67 ppm lithium (from 0.25 ml of a lithium acetate dehydrate solution in methanol; 0.0068 grams Li/mL of solution), and a final polymerization temperature of 280° C. at 1.0 mm Hg. The light yellow polymer had an IV of 0.77 dL/g, Tm of 251° C., Tg of 128° C. and cis/trans ratio of 56/44.

Example 5

The procedure of Example 2 was repeated using 39.0 grams (0.15 moles) of 43/57 cis/trans TMCD bis(methyl carbonate), 0.0075 grams (100 ppm sodium) of sodium formate and a final polymerization temperature of 280° C. at 1.0 mm Hg. The light yellow polymer had an IV of 0.92 dL/g, Tm of 255° C., Tg of 133° C., and cis/trans ratio of 56/44.

Examples 2 through 5 illustrate the unexpectedly good results obtained by the process of the present invention. Examples 2 through 5 all produced high molecular weight poly(2,2,4,4-tetramethyl-1,3-cyclobutylene carbonate) having little or no color. Examples 2, 4 and 5 demonstrate the preferred process of producing polycarbonate with inherent viscosities greater than 0.7 dL/g by using about 50 to 60 mole % trans isomer as the biscarbonate reactant.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method for preparing a polycarbonate, comprising:
   (a) admixing
      (i) a compound having the structure I:

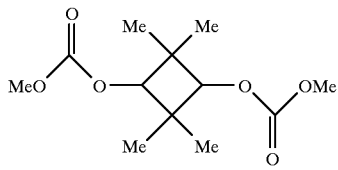

and
      (ii) a basic catalyst, and
   (b) heating the admixture of step (a) to produce the polycarbonate having an inherent viscosity of at least 0.4 dL/g, as determined in 60/40 wt/wt phenol/tetrachloroethane solution at 25° C.

2. The method of claim 1, wherein the compound having the structure I is from 0 to 40 mole % a trans isomer and from 60 to 100 mole % a cis isomer, wherein the total trans and cis content equals 100 mole %.

3. The method of claim 1, wherein the compound having the structure I is from 50 to 60 mole % a trans isomer and from 40 to 50 mole % a cis isomer, wherein the total trans and cis content equals 100 mole %.

4. The method of claim 1, wherein the basic catalyst comprises an alkali metal, an alkali metal salt, or a combination thereof.

5. The method of claim 4, wherein the alkali metal comprises lithium, sodium, potassium, or a combination thereof.

6. The method of claim 4, wherein the alkali metal salt comprises an alkali metal alkoxide or an alkali metal carboxylate.

7. The method of claim 4, wherein the alkali metal salt comprises an alkali metal methoxide, an alkali metal ethoxide, an alkali metal isopropoxide, an alkali metal butoxide, an alkali metal isobutoxide, an alkali metal formate, an alkali metal acetate, or a combination thereof.

8. The method of claim 1, wherein the basic catalyst is lithium or sodium.

9. The method of claim 1, wherein the basic catalyst is from 10 to 400 ppm based on the amount of the compound having the structure I.

10. The method of claim 1, wherein the basic catalyst is from 25 to 200 ppm based on the amount of the compound having the structure I.

11. The method of claim 1, wherein the basic catalyst is from 50 to 100 ppm based on the amount of the compound having the structure I.

12. The method of claim 1, further comprising prior to the heating step, admixing a modifying carbonate with a compound having the structure I and the basic catalyst.

13. The method of claim 12, wherein the modifying carbonate comprises the product of reacting a modifying glycol and dimethyl carbonate.

14. The method of claim 12, wherein the modifying glycol comprises an aliphatic glycol of from 2 to 8 carbon atoms.

15. The method of claim 13, wherein the modifying glycol comprises 1,2-propanediol, ethylene glycol, 1,3-propanediol, neopentyl glycol, 1,2-, 1,3-, 1,4-butanediol, 1,5-pentanediol, 1,6-hexanediol, or a combination thereof.

16. The method of claim 13, wherein the modifying carbonate is from 0.1 to 10 mole %, wherein the sum of the modifying carbonate and the compound having the structure I is 100 mole %.

17. The method of claim 1, wherein the heating step is from 160 to 280° C.

18. The method of claim 1, wherein the heating step is initially from 160 to 180° C. and the temperature of the heating step is increased to 280° C. in a plurality of stages.

19. The method of claim 18, wherein the number of stages is from 3 to 5.

20. The method of claim 18, wherein when the temperature reaches 280° C., a vacuum is applied to the polycarbonate.

21. The method of claim 20, wherein the vacuum is less than or equal to 1 mm Hg pressure.

22. The method of claim 1, wherein the heating step is less than or equal to 6 hours.

23. The method of claim 1, wherein a compound having the structure I is admixed with lithium or sodium, and the admixture is heated from 160 to 280° C.

24. The method of claim 1, wherein the polycarbonate has an inherent viscosity of at least 0.7 dL/g, as determined in 60/40 wt/wt phenol/tetrachlorethane solution at 25° C.

25. The method of claim 1, further comprising, after the heating step, polymerizing the polycarbonate in the solid state.

26. The method of claim 25, wherein the polycarbonate has an inherent viscosity of at least 1.0 dL/g, as determined in 60/40 wt/wt phenol/tetrachlorethane solution at 25° C.

27. A process of preparing poly(2,2,4,4-tetramethyl-1,3-cyclobutylene carbonate), comprising condensing carbonic acid 3-methoxycarbonyloxy-2,2,4,4-tetramethyl-cyclobutyl ester methyl ester in the presence of a catalyst selected from the group consisting of alkali metals, alkoxides of alkali metals, carboxylates of alkali metals, and mixtures thereof under polycondensation conditions of temperature and pressure.

28. The polycarbonate made by the method of claim 1.

29. The polycarbonate made by the method of claim 25.

30. A polycarbonate, comprising poly(2,2,4,4-tetramethyl-1,3-cyclobutylene carbonate) with an inherent viscosity of at least 0.7 dL/g, as determined in 60/40 wt/wt phenol/tetrachlorethane solution at 25° C.

31. The polycarbonate of claim 30, wherein the polycarbonate has low color.

32. A blend, comprising the polycarbonate of claim 30 and a second polycarbonate, a polyester, a polyether, a polyacetal, a polyolefin, a cellulose material, a polyurethane, a polyamide, or a combination thereof.

33. The blend of claim 32 further comprising an antioxidant, a stabilizer, a pigment, a colorant, a filler, a reinforcing agent, or a combination thereof.

34. An article made from the polycarbonate of claim 30.

35. An article made from the blend of claim 32.

* * * * *